Oct. 27, 1936.　　　L. J. A. LE GOFF　　　2,058,697
STATIC POLARIZATION OF ALTERNATING CURRENT APPARATUS
Filed April 24, 1933　　　3 Sheets-Sheet 1

L. J. A. Le Goff
INVENTOR

By: Marks & Clerk
Attys.

Oct. 27, 1936.　　L. J. A. LE GOFF　　2,058,697
STATIC POLARIZATION OF ALTERNATING CURRENT APPARATUS
Filed April 24, 1933　　3 Sheets-Sheet 3
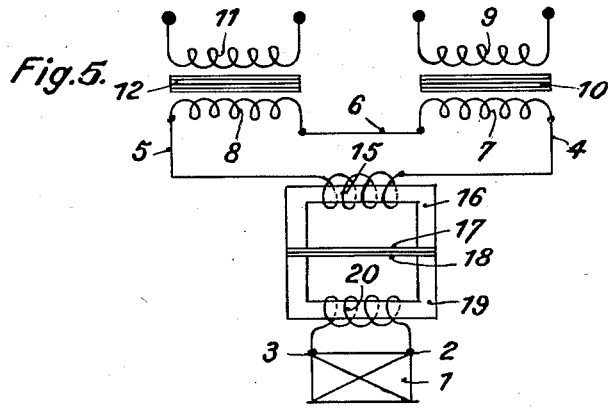
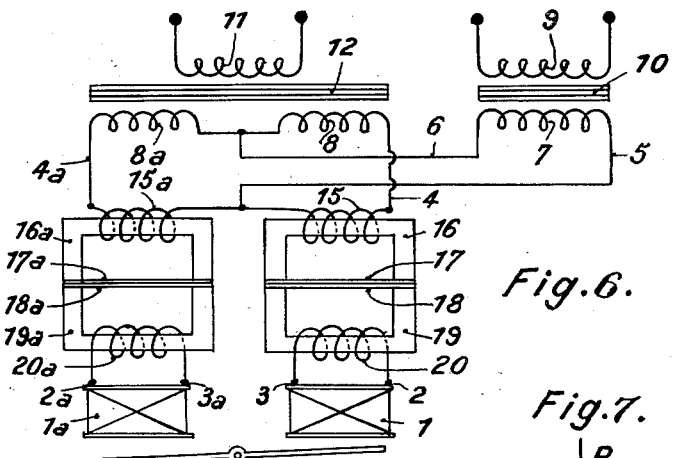
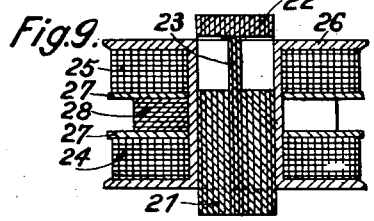
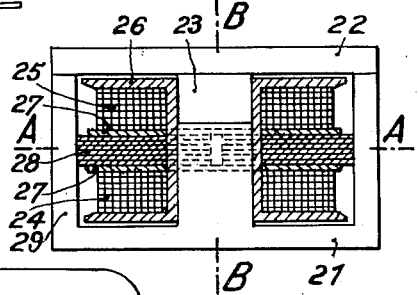
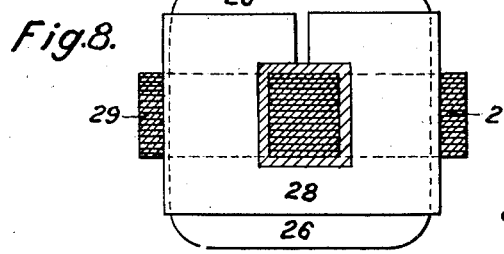

Patented Oct. 27, 1936

2,058,697

UNITED STATES PATENT OFFICE 2,058,697

STATIC POLARIZATION OF ALTERNATING CURRENT APPARATUS

Lucien Joseph Armand Le Goff, Clichy, France, assignor to Société d'Electricité Mors, Clichy (Seine), France Application April 24, 1933, Serial No. 667,748
In France April 26, 1932

4 Claims. (Cl. 175—320)

A great variety of alternating current apparatus is known, the operation of which is obtained if a phase relation is established between the current of the particular control supply and the current of the general governing supply.

These apparatus comprise movable parts and, consequently, they are liable to wedge, they require a certain maintenance and are subjected to wear.

The present invention relates to a device which, whilst comprising no movable parts, is capable of introducing a phase relation in the operation of a main apparatus, a relay for instance, adapted to actuate contacts, screens, etc.

Figure 1:
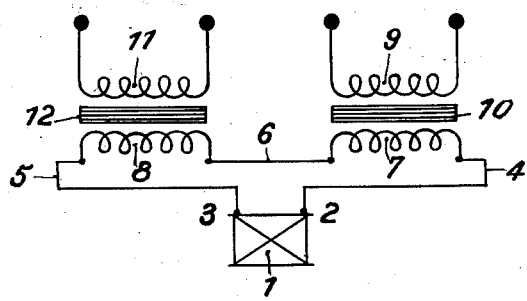

Fig. 1 of the accompanying drawings diagrammatically illustrate, by way of example only, an arrangement according to the invention.

Figs. 2 to 6 diagrammatically illustrate modifications.

Figs. 7 to 9 illustrate a transformer constructed according to the invention.

Referring to Fig. 1, the main apparatus, which can be an alternating current relay of a known type, is shown at 1. This relay is energized when a voltage (a) is applied to the terminals 2 and 3, and is de-energized when a voltage (b) is applied to the terminals 2 and 3. The relay is inserted in an electric circuit comprising conductors 4, 5, 6 and windings 7 and 8. The winding 7 is the secondary of a transformer, the primary 9 of which receives the particular or control current supply. The magnetic circuit 10 of the transformer can be constituted, as will be seen later on, in such a manner that, by the action of magnetic leakage, by the saturation of certain elements and by the choice of the material constituting it, the flux passing through the winding 7 is maintained nearly constant beyond a certain value.

In these conditions, if the primary winding 9 is supplied with increasing alternating voltages, the secondary voltage first increases, reaches a value (c), and then remains nearly constant.

The winding 8 is the secondary of a transformer, the primary 11 of which is subjected to the governing voltage. The magnetic circuit 12 of this transformer, can be of a constitution similar to that of the magnetic circuit 10, so that the voltage (d) induced in the winding 8 is maintained approximately constant notwithstanding important variations of the governing voltage.

In these conditions, the primaries of the transformers being fed, the voltage applied at the terminals 2 and 3 of the relay is the composition of the voltages (c) and (d) of the secondaries, the value of which is (e). This voltage (e) can vary in absolute value from (c−d) to (c+d), according to the phase displacement of the particular and governing voltages. The relay will therefore be energized if the value of (c+d) is greater than (a), and it will be de-energized if (c−d) is smaller than (b). Consequently, the energization of the relay depends on the value and on the direction of phase displacement of the particular and governing voltages.

The choice of the value of the voltages (c) and (d) must therefore be such that each of these voltages, acting separately, is unable to maintain the relay 1 energized. Protecting devices, such as self-induction coils, condensers, resistances, can be provided and preferably inserted in the primary circuit of the governing current supply, in such a manner that the maximum energy available at the secondary 8 is small with regard to the energy necessary for maintaining the relay energized.

Figure 2:
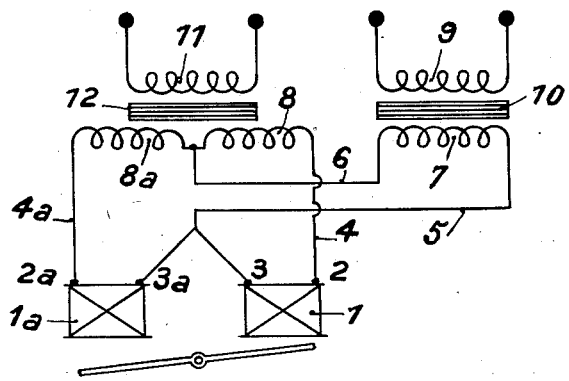

A first modification of this device, illustrated in Fig. 2, relates to the case in which the relay has two controlled positions and one neutral position. In this case, the relay has two control elements 1 and 1a. The transformer receiving the governing current supply, is provided with two secondaries 8 and 8a connected in series, wound in the same direction or in reverse direction, and the common point of which is connected by a conductor 6 to the secondary 7 of the transformer receiving the control current supply. The secondary 7 is, on the other hand, connected by the conductor 5 to the terminals 3 and 3a of the control elements of the relay. The terminals 2 and 2a of these elements are connected by conductors 4 and 4a to the secondaries 8 and 8a. Each of the secondaries 8 and 8a produces a voltage (d), as previously, and the secondary 7 also produces a voltage (c).

It will be seen that, on the one hand, the element 1 is subjected, in the circuit 1—3—5—7—6—8—4, to a voltage resulting from the composition of the voltages (c) and (d), and that, on the other hand, the element 1a in the circuit 1a—3a—5—7—6—8a—4a, is likewise subjected to a voltage resulting from the composition of the voltages (c) and (d). It will also be seen that, in these compositions of voltages, the voltage (c) acts in two opposite directions and on both circuits. It results therefrom that the absolute values of the resulting voltages applied to the elements 1 and $1a$ are different, this causing energization of the relay in the suitable direction.

Figure 3:
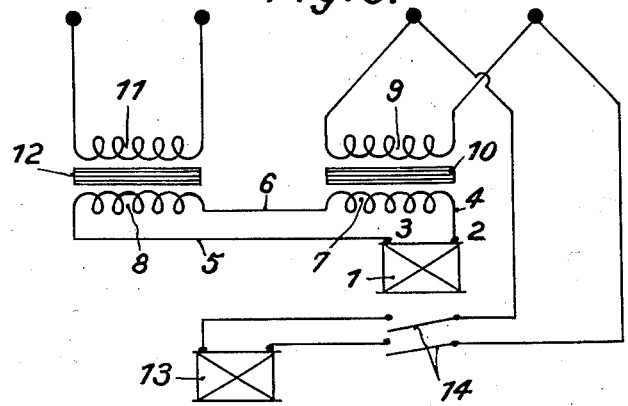

A second modification, illustrated in Fig. 3, corresponds to the case in which the main relay 13 is directly actuated by the control current.

The relay 1 (which has become an auxiliary relay exerting a control action as in the case of Fig. 1) acts, through the medium of contacts 14, for switching the supply circuit of the main relay 13.

In another modification (Figure 4), the main relay 1 operates with direct current by utilizing a current rectifier 32; this rectifier is fed by the secondary winding 31 of a transformer, the primary winding 30 of which receives the composition of the voltages $(c)$ and $(d)$; the rectifier 32 is mounted according to the known device on a Wheatstone bridge.

A portion of the current supplied by the rectifier can be used for feeding windings arranged in portions or branches of the magnetic circuits 10 and 12 of the transformers for the purpose of creating in these elements conditions of saturation conditioning the value of the secondary voltages in the windings 7 and 8.

Figure 4:
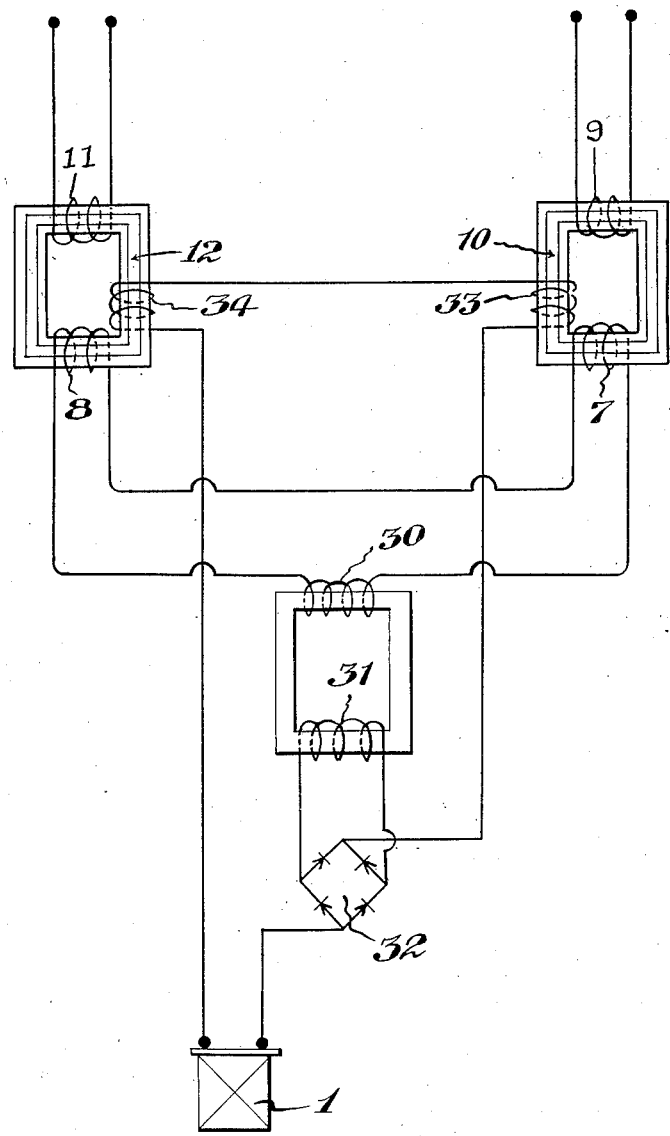

According to Figure 4, the circuit of rectified current feeding the main apparatus 1 comprises for this purpose windings 33 and 34 arranged in the magnetic circuits 10 and 12 in series with the main apparatus. These windings are also adapted to be fed in parallel with the main apparatus 1.

Figs. 5 and 6 illustrate devices, derived from the preceding ones, but improved in order to increase the certainty of operation of the main apparatus.

In these modifications, if one of the particular or governing current supplies is eliminated for any reason, for instance in case of a disturbance on the line, any residual current is automatically eliminated.

In Figs. 5 and 6, the reference letters and numbers previously used designate similar parts.

Referring to Fig. 5, it will be seen that the transformer having a magnetic circuit 10 and windings 7 and 9, is arranged as previously for supplying a particular secondary voltage $(c)$, approximately constant notwithstanding the variations of the particular primary voltage above a definite value.

Likewise, the transformer, having a magnetic circuit 12 and windings 8 and 11, is arranged as previously described, for supplying a secondary governing voltage $(d)$ approximately constant notwithstanding the variations of the primary governing voltage.

A so-called "mixing" circuit is constituted by the winding 8, conductor 5, winding 7, conductor 4, winding 15 of a magnetic circuit 16, and the conductor 5.

The magnetic circuit 16 is composed of a U-shaped body, completed by a yoke 17 of reduced cross section. The yoke 17 is lined with a non-magnetic blade 18, of suitable thickness, on which bear the branches of a U-shaped body 19. The branches of the magnetic circuit 19 are arranged opposite those of the magnetic circuit 16.

A winding 20 arranged on the body 16, feeds the main relay 1 through two conductors leading to the terminals 2 and 3.

By means of these arrangements, if alternating voltages, the efficient value of which increases, are applied to the winding 15, the flux produced by the said winding 15 will first preferably utilize the yoke 17, as long as the latter will be sufficiently permeable; the portion passing through the two air gaps formed by the blade 18 under the branches of the body 19 will be very small and the voltage induced in the winding 20 will remain negligible. In proportion as magnetic saturation of the yoke 18 takes place (and so much the more rapidly as the material constituting the latter presents a characteristic having a more eccentuated bend), the portion of flux acting on the winding 20 will be more important.

It will then be easy to compute the characteristics of the various parts or members, in such a manner that the voltage applied to the relay 1 between the terminals 2 and 3 should be negligible for all the values of voltages applied to the winding 15 which do not correspond to a value approximating the resulting maximum voltage $c+d$, when the voltages $c$ and $d$ are in phase.

In these conditions, the voltage applied to the relay 1 between the terminals 2 and 3 remains negligible for a voltage applied to the winding 15, corresponding either to the particular voltage $(c)$ alone, or to the governing voltage $(d)$ alone, or to the values approximating the absolute value of $(c-d)$.

Referring to the modification of Fig. 6 (corresponding to Fig. 2) and in which the relay has two controlled positions, it will be seen that in this modification each of the control elements 1 and $1a$ is connected to the "mixing" circuit through the medium of a special magnetic circuit and of its windings, similar to that previously described. As in the preceding case, the control windings 1 and $1a$ are traversed by an appreciable current only when the windings 15 or $15a$ are subjected to a voltage approximating the value obtained by the composition of the governing and control secondary voltages approximately in phase.

Figs. 7 to 9 illustrate a form of construction of transformers subjected to the particular or to the governing current supply. Fig. 7 is a sectional view made according to a plane parallel to the laminae of the magnetic circuit. The transformer comprises a W-shaped body 21; constituted by a stack of thin plates and a yoke 22, which yoke is constituted in the same manner. A portion only of the thin plates of the central core 23 comes in contact with the yoke 22. The primary and secondary windings 24 and 25, respectively, are made on a support 26 of insulating material.

The windings 24 and 25 are separated by small insulating plates 27, between which are interposed small magnetic sheet metal plates 28, having dimensions sufficient for nearly coming in contact with the side cores 29 of the magnetic circuit.

The plates 28 are provided with a gap so as not to form a closed convolution about the core 23.

It is easy to see that, in these conditions, as long as the voltage applied to the winding 24 is relatively small, the flux nearly exclusively follows the path offered by the portion of small cross section of the core 23, thus generating a certain voltage in the winding 25. For higher values of the voltage applied to the winding 24, the portion of small cross section of the core 23 saturates and the flux closes about the winding 24 by following the path offered by the washers 28, the voltage then becomes nearly constant and equal to $c$ in the secondary winding 25.

The arrangements described are particularly adapted to disclose the invention and do not constitute a limitation of the same.

The details of construction, dimensions, materials used, etc., can, particularly, be varied according to each particular case.

What I claim as my invention and desire to secure by Letters Patent is:

1. An electric device comprising two transformers including primary and secondary windings, the primary windings being supplied with alternating currents, a mixing winding connected in series with the secondary windings and forming a closed circuit, a magnetic circuit influenced by said mixing winding and including a branch only traversed by a flux above a certain value of the voltage at the ends of the mixing winding, a winding on said branch, and an apparatus of the relay type at the ends of the last mentioned winding.

2. An electric device comprising two transformers including primary and secondary windings, the primary windings being supplied with alternating currents, a mixing winding connected in series with the secondary windings and forming a closed circuit, a closed magnetic circuit adapted to be influenced by the mixing winding and including a branch capable of being easily saturated, an open magnetic circuit opposite the closed magnetic circuit, a non-magnetic blade connected with the ends of the open magnetic circuit and arranged adjacent said branch, a winding on said open magnetic circuit, and an apparatus of the relay type at the ends of said last mentioned winding.

3. An electric device comprising two transformers including primary and secondary windings, the primary windings being supplied with alternating currents, a mixing winding connected in series with the secondary windings and forming a closed circuit, a magnetic circuit of U-shape on which said mixing winding is arranged, a thin magnetic blade connecting the ends of the U-shaped magnetic circuit, a second magnetic circuit of U-shape, a thin non-magnetic blade arranged adjacent the first blade and connecting the ends of the branches of the second magnetic circuit, a winding on the last mentioned magnetic circuit, and an apparatus of the relay type at the ends of the last mentioned winding.

4. An electric device comprising two transformers including primary windings supplied with alternating currents, two secondary windings for one of the transformers and one secondary winding for the other transformer one end of which is connected at the common point of the said two secondary windings, two mixing windings connected in series, the other end of said one secondary winding being connected at the common point of the series connected mixing windings, the ends of the mixing windings being connected to the extreme points of said two secondary windings, two magnetic circuits each influenced by one of the mixing windings and including a branch only traversed by a flux above a certain value of voltages applied to the ends of said mixing windings, a winding on each of said branches, and an apparatus of the relay type at the ends of each of the last mentioned windings.

LUCIEN JOSEPH ARMAND LE GOFF.